United States Patent [19]
Lennen

[11] Patent Number: 5,815,539
[45] Date of Patent: Sep. 29, 1998

[54] SIGNAL TIMING SYNCHRONIZER

[75] Inventor: Gary R. Lennen, Cupertino, Calif.

[73] Assignee: Trimble Navigation Limited, Sunnyvale, Calif.

[21] Appl. No.: 679,627

[22] Filed: Jul. 12, 1996

Related U.S. Application Data

[63] Continuation of Ser. No. 409,875, Mar. 24, 1995, abandoned, which is a continuation of Ser. No. 823,980, Jan. 22, 1992, Pat. No. 5,402,450.

[51] Int. Cl.[6] .............................. H04L 7/00; H04L 25/36; H04L 25/40
[52] U.S. Cl. ......................... 375/371; 375/367; 370/516
[58] Field of Search ................................... 375/367, 371; 370/515, 516

[56] References Cited

U.S. PATENT DOCUMENTS

| 3,915,090 | 10/1975 | Hurst et al. .............................. 101/426 |
| 4,203,070 | 5/1980 | Bowles et al. . |
| 4,426,712 | 1/1984 | Gorski-Popiel . |

(List continued on next page.)

FOREIGN PATENT DOCUMENTS

| 0166300 | 1/1986 | European Pat. Off. . |
| 0166911 | 1/1986 | European Pat. Off. . |
| 0312193 | 4/1989 | European Pat. Off. . |
| 0336418 | 10/1989 | European Pat. Off. . |
| 0351156 | 1/1990 | European Pat. Off. . |
| 0460862A2 | 12/1991 | European Pat. Off. . |
| 0488739A1 | 6/1992 | European Pat. Off. . |
| 2155268 | 9/1985 | United Kingdom . |
| 2215539 | 9/1989 | United Kingdom . |

OTHER PUBLICATIONS

J.J. Spilker, Jr., Ph.D., "Digital Communications by Satellite", 1977, pp. 536–538.

R.F. Ormondroyd, et al., "An Improved Delay Lock Loop For Use In Ranging and Data Modulated Spread–Spectrum Systems", IEEE Proceedings, vol. 132, No. 6, Dec. 1985, pp. 291–300.

Walter J. Gill, "A Comparison of Binary Delay–Lock Tracking Loop Implementations, IEEE Transactions on Aerospace and Electronic Systems", vol. AES–2, No. 4, Jul. 1966, pp. 415–424.

Dr. C.R. Chan, "Spread Spectrum Applications and State–of–the Art Equipment", Magnavox Communications and Navigation, Nov. 22, 1972.

L.A.A. Al–Rawas and R.F. Ormondroyd, "Novel Delay–Lock–Loop Implementation of Reduced Acquisition Time of PN Sequences", Nov. 1983.

Langley, R.B., Why is the GPS Signal So Complex?, GPS World, May/Jun. 1990, pp. 56–59.

Article entitled Proceedings of the Satellite Division International Technical Meeting, Sep. 19–23, 1988.

OTHER PUBLICATIONS

Primary Examiner—Stephen Chin
Assistant Examiner—Mohammad Ghayour
Attorney, Agent, or Firm—William E. Pelton, Esq.

[57] ABSTRACT

A method and apparatus are disclosed for characterizing multipath-induced distortions in the autocorrelation function of a correlation receiver in order to reduce effects of these multipath-induced distortions on the accuracy of detecting the time of arrival of a received signal. The magnitude of the multipath-induced errors adversely affecting the shape of the autocorrelation function is estimated in real time, for example, through the use of secondary scanning correlators whose time base is independent of a typical receiver's detection-oriented correlators. This error is subtracted from the detection-oriented correlator's timing, thereby yielding a more accurate autocorrelation function.

17 Claims, 15 Drawing Sheets

U.S. PATENT DOCUMENTS

| | | |
|---|---|---|
| 4,457,006 | 6/1984 | Maine . |
| 4,521,111 | 6/1985 | Paulson, Jr. et al. .................... 356/361 |
| 4,530,103 | 7/1985 | Mosley, Jr. et al. . |
| 4,545,061 | 10/1985 | Hileman . |
| 4,611,333 | 9/1986 | McCallister et al. . |
| 4,628,320 | 12/1986 | Downie ..................................... 342/16 |
| 4,706,286 | 11/1987 | Sturza . |
| 4,754,465 | 6/1988 | Trimble . |
| 4,785,463 | 11/1988 | Janc et al. . |
| 4,791,378 | 12/1988 | Waltham . |
| 4,800,577 | 1/1989 | Tachita et al. . |
| 4,807,256 | 2/1989 | Holmes et al. . |
| 4,821,294 | 4/1989 | Thomas, Jr. . |
| 4,829,543 | 5/1989 | Borth et al. . |
| 4,847,862 | 7/1989 | Braisted et al. . |
| 4,894,842 | 1/1990 | Broekhoven et al. . |
| 4,910,794 | 3/1990 | Mahany .................................... 455/67 |
| 4,932,036 | 6/1990 | Goradia et al. . |
| 5,016,257 | 5/1991 | Wolf et al. . |
| 5,070,536 | 12/1991 | Mahany et al. ........................... 455/67 |
| 5,101,416 | 3/1992 | Fenton et al. . |
| 5,148,452 | 9/1992 | Kennedy et al. . |
| 5,157,695 | 10/1992 | Westerfield et al. . |
| 5,245,472 | 9/1993 | Kachi et al. ......................... 370/104.1 |
| 5,285,472 | 2/1994 | Leonard et al. ............................. 375/1 |
| 5,390,207 | 2/1995 | Fenton et al. . |
| 5,414,729 | 5/1995 | Fenton . |
| 5,483,676 | 1/1996 | Mahany et al. ........................ 455/67.4 |
| 5,495,499 | 2/1996 | Fenton et al. . |
| 5,528,635 | 6/1996 | Negi ........................................ 375/367 |
| 5,566,202 | 10/1996 | Lang ........................................ 375/210 |
| 5,598,429 | 1/1997 | Marshall .................................. 375/210 |

OTHER PUBLICATIONS

Hagerman, L.L., "Effects of Multipath on Coherent and Non–Coherent PRN Ranging Receivers", The Aerospace Corporation Report No. TOR–0073 3020–03)–3, 15 May 1973.

Digital Communications and Spread Spectrum Systems, by Rodger E. Ziemer and Roger L. Peterson, Ch. 9, pp. 419–447, copyright 1985.

SIGNAL TIMING SYNCHRONIZER

This application is a continuation of application Ser. No. 08/409,875, filed Mar. 24, 1995, now abandoned which is also a continuation of application Ser. No. 07/823,980, filed Jan. 22, 1992 (now U.S. Pat. No. 5,402,450).

FIELD OF THE INVENTION

The present invention relates generally to signal timing synchronization for radio receivers and, more specifically, to methods and apparatus for improving the accuracy of measuring the time-of-arrival of an incoming signal in, by way of example, a spread spectrum correlation receiver by reducing the adverse effects of multipath signals on the measurement. The invention also relates generally to any communications system that may suffer from multipath effects.

BACKGROUND OF THE INVENTION

The Global Positioning System (GPS) as now being implemented utilizes a number of satellites in precise orbits that broadcast navigational information that may be used by anyone with a proper GPS satellite receiver. This so-called navigational information is also useful to surveyors and the like because it can provide accurate positional information concerning any point on the globe. Each satellite in the GPS system broadcasts with the same carrier frequency and each includes an individual code that serves to identify the particular satellite. The codes are generally long and are made up of a pattern of 1's and 0's that repeats over long time periods relative to the data rate. A complete study and report on GPS signals has been published by J. J. Spilker, Jr., "GPS Signal Structure and Performance Characteristics", Navigation, 1980. In addition, the state of the art heretofore in satellite communications is also represented by J. J. Spilker, Jr. in his book "Digital Communications by Satellite", Prentice Hall, Inc. 1977.

Radio receivers for the GPS navigation data bit stream are commonly referred to as correlation receivers and examples of such receivers are described in U.S. Pat. No. 4,754,465 ("'465 patent") to Charles Trimble, which is assigned to the assignee of the present application. The disclosure of the '465 patent is incorporated herein by reference. Correlation receivers are typically employed because they are designed for situations typically encountered in satellite broadcasting where the strength of the GPS signal is quite weak compared to the noise level. The relative noise level is high at least in part because the receiver must use a wide-angle antenna, which has very low gain, due to the system constraint of having to listen to a number of satellites that might be located anywhere in the sky.

In order to boost the weak signal without also amplifying the noise, it is the practice to use spread spectrum modulation in GPS satellite systems. The spread spectrum technique modulates the satellite transmission by the individual satellite identification code, and this has the effect of spreading the satellite signal over a bandwidth that is determined by the reciprocal of the pulse width. Conversely, the receiver multiplies the signal received on the ground by a replica of the individual satellite code, and this kind of demodulation is generally known as correlation. A typical spread spectrum receiver is described in U.S. Pat. No. 4,965,759 to Uchida et al. Spread spectrum systems in general are more fully described by R. C. Dixon, "Spread Spectrum Systems", J.Wiley & Sons, Inc., 1976.

A particular advantage of using spread spectrum modulation is that it allows the time of arrival of the transmitted signal to be determined by the receiver. This time-of-arrival measurement is the cornerstone of the satellite-based GPS system and is used to calculate the "pseudo-range", which is the first-cut estimate of the distance between the receiver and a GPS satellite.

Determining the time of arrival of a signal requires the recognition of at least a portion of the incoming signal and a comparison of the time of arrival of the incoming signal with the time that it was known to have been transmitted. This measurement is made by aligning the incoming code and the local code using a code tracking loop. Such code tracking loop adjusts the delay time of one code with respect to the other and tries to minimize the time difference between the incoming and local codes. The time-of-arrival measurement is then based on the current local code delay time as measured by the local clock relative to the known time when the incoming signal was transmitted. When this delay time is multiplied by the signal propagation speed, which is assumed to be the speed of light, the path length is derived. As mentioned above, this path length is referred to as the pseudo-range because the local clock is not in perfect synchronism with the transmitter clock. Therefore, any errors affecting the code tracking loop will also directly affect the time-of-arrival measurement.

As mentioned above, a correlation receiver typically demodulates the spread spectrum signal by multiplying the incoming signal with a locally generated replica of the spread spectrum code. The operation of multiplying the local code and the incoming signal to produce measurable signal power at the receiver requires that the local code and the incoming code be aligned with each other to be within one cycle of the code clocking rate. This one cycle at the clocking rate is also referred to as a "chip". If the two codes are within one chip of each other, some measurable signal power will be observed at the output of the receiver correlator, and the closer the two codes are aligned, the greater the power is that will be observed. The relationship of the delay time between the two codes to the amount of signal power observed at the output of the correlation operation is called the autocorrelation function (AF). It will be appreciated that peak received power will be detected when the two codes are perfectly aligned in time. The autocorrelation function is generally observed as a series of correlation spikes output from a matched filter in the correlator circuit. This type of receiver is commonly known as a "matched filter" receiver. By keeping the local code phase synchronous with the code phase of the received signal, optimum detection of the modulation is accomplished, and from this optimized detection the time-of-arrival of the signal is determined. Through subsequent calculations, the latitude, longitude, and height of the receiver can be determined.

The ideal autocorrelation function between two spread spectrum codes is shown by the spike 10 in FIG. 1. This correlation spike represents the voltage output of a correlating receiver as a function of the relative shift in time between the two correlating codes. Therefore, the maximum voltage at the output of the correlator, as shown at the peak 10a in FIG. 1 will be ideally detected when the two codes are in perfect alignment.

The true autocorrelation function in a real receiver is, however, somewhat different from the ideal and is shown by the curve 12 in FIG. 1. As will be noted, the peak of the curve 12 is not sharp, and the leading and trailing slopes from the peak are not straight. This rounding of the ideal triangular shape is caused by the use of finite-bandwidth filters in the receiver prior to correlation and, more importantly, this rounding has been found to be significant in determining and compensating for multipath effects, described in detail below.

The basic elements of a typical correlation receiver are shown in FIG. 2. The incoming spread spectrum signal is received by an antenna and low noise amplifier 20 and is mixed to baseband in a mixing stage 22 by a locally generated carrier signal from a local oscillator 24. This mixing is performed in mixing stage 22 so that quadrature signals (Q), as well as in-phase signals (I), are available at baseband to facilitate carrier tracking. Both of the quadrature and in-phase baseband signals (Q and I) after the mixing are still binary phase-shift keyed (BPSK) modulated by the spreading code and by any lower rate information modulation that might be included in the satellite transmitted signal. For example, in the Global Positioning System the baseband signals contain a coarse/acquisition (C/A) spreading code having a clock rate of 1.023 MHz and a precision spreading code having a clock rate of 10.23 MHz, as well as a lower rate 50 baud data bit stream. The local oscillator 24 output also drives a code clock generator 26 having an output fed to a local code generator 28 that generates the local code signal fed to the correlators 30. The correlators 30 then do correlation between the local code and the baseband signals and the correlation output is fed to a microprocessor 32 for performing the necessary time-of-arrival calculations. The microprocessor 32 also controls the timing of the local oscillator 24 and code clock generator 26, as well as telling the local code generator 28 which individual code to generate.

Determination of the optimum local code delay time requires a feedback technique that either minimizes some error signal based on the difference between the local code and the incoming code or that maximizes the autocorrelation function (AF). Because the signals are so weak, it has generally been the case to elect to use a differencing technique involving the use of "early-late" gates instead of looking for a maximum of the autocorrelation function. This early-late gate approach relies upon the fact that the ideal, uncorrupted autocorrelation function is symmetrical around its peak, the peak being representative of the point in time where the codes are perfectly synchronized. Correlation receivers then have heretofore attempted to locate the peak in time of the autocorrelation function, because this point represents perfect code alignment.

Typically, measurement of the degree of correlation between the incoming code and the local code is performed at three distinct points on the autocorrelation function. These correlation points are:

the punctual (P) point, where voltage output is maximized due to perfect alignment of the two codes;

the early (E) point, which represents voltage output when the two codes are approaching alignment and are about ½ chip out of alignment, i.e., where the local code is advanced by ½ chip with respect to the incoming code; and the late (L) point, which represents voltage output when the two codes are receding from alignment, i.e., where the local code is delayed by ½ chip with respect to the incoming code. only one time offset is used to shift all three correlators synchronously. In other words, the time shifts of the correlators are not independent of one another.

The early-late gate method begins by measuring the autocorrelation function and establishing a sample voltage level, and in doing this the receiver samples the autocorrelation function at the beginning of the −1 bit time interval, shown as the $i^{th}$ sample interval in FIG. 4. The microprocessor easily can keep track of successive samples and so samples that are one chip interval apart are subtracted from one another. The later time sample, the "late" gate, is shown as the $k^{th}$ interval in FIG. 4 and is subtracted from the early time sample, the "early" gate, resulting in a well-known control function that can be used to drive the local code chip time delay so that the local code is synchronized with the incoming code. This early-late gate error function is shown in FIG. 5 at curve 80 relative to the autocorrelation function shown as curve 82. As the early-late gate sampling function 80 progresses in time, i.e. is shifted in time to the right on the graph of FIG. 5, the difference between the early and late voltages diminishes, and when that difference (the error function) equals zero volts the peak of the autocorrelation function is found and the local code is synchronized with the incoming code. This occurs at 21 time units in the specific example shown in FIG. 5.

Thus, the early-late gate method in effect drives the error voltage to zero, measures the offset in code phase relative to a local clock, and derives an estimate of the time-of-arrival of the incoming signal. The punctual correlator output serves as a check on the steering provided by the early-late gate correlators, and in an interference-free environment, can confirm the early-late gate derived position of the peak. Nevertheless, the punctual correlator cannot provide any steering information on which way to shift the local code. With no extraneous interfering signals, this early-late gate method works well.

The correlators 30 that are typically employed in a correlating receiver such as that of FIG. 2 are shown in more detail in FIG. 3. In the correlators of FIG. 3, the baseband signals from the mixing stage 22 are fed to respective sets of three mixers corresponding to early, punctual, and late. More specifically the in-phase baseband signals (I) on line 40 are fed to mixers 42, 44, 46 that also receive the local code from the local code generator 28. This local code is fed on line 48 to a distributor unit 50 that might consist of a shift register and that operates to sequentially distribute the local code input on line 48 to the three mixers 42, 44, 46. Similarly, the quadrature baseband signals (Q) on line 52 are fed to three mixers 54, 56, 58 corresponding to early, punctual, and late, and these three mixers 54, 56, 58, respectively also receive the local code from the distributor unit 50.

The extent of coincidence between the received signal (I and Q) and the local code in the three states as determined by the mixers 42, 44, 46 and 54, 56, 58 is accumulated over a number of cycles in six accumulators 60, 62, 64, 66, 68, 70 that are connected respectively to the above-noted mixers. Thus, early, punctual, and late data for both the in-phase and quadrature signals are fed to the microprocessor 32 where the appropriate timing calculations are performed.

The information from the early and late correlators is combined by the microprocessor 32 to generate a delay locked loop tracking signal that is used to close the code tracking loop. The information used to close the code tracking loop is taken from early and late comparisons of the local and incoming codes; therefore, the performance of this code tracking determines the accuracy of the time-of-arrival measurement, which is used to generate the pseudo-range. As described hereinabove, the time-of-arrival measurement is typically performed by comparing in time the local code, which ideally is tracking in perfect alignment with the transmitted code, with the time reference of the receiver.

As indicated below, such prior attempts to locate the peak in time of the autocorrelation function have not yielded entirely satisfactory results. Certain types of interfering signals can distort the autocorrelation function in a way that transfers errors into the tracking loop.

One troublesome kind of interfering signal is known as multipath. Multipath refers to the phenomenon in radio wave propagation wherein a receiver system is able to collect a so-called primary signal, representing the direct path of radio wave propagation between the source and the receiver, and also a plurality of secondary delayed versions of the direct signal, representing reflections of the direct signal from objects adjacent the direct path. This phenomenon is particularly acute in receiver systems with large coverage-area antennas, such as are commonly found in GPS systems. The magnitude of multipath error induced in GPS systems has been reported by J. M. Tranquilla et al., "GPS Multipath Field Observations at Land and Water Sites", Navigation Journal of the Institute of Navigation, Vol. 37, No. 4, 1990–91.

Signal reception at moving vehicles suffers from this phenomenon to an even greater extent. Multipath adversely affects FM reception, cellular mobile telephony, and other voice/data radio systems, whether or not they use spread spectrum digital modulations. In minimizing the adverse affects of multipath, the present invention is not limited to GPS systems and is completely applicable to these other applications, particularly where a spread spectrum technique is employed.

An example of a typical receiver system with multipath signals is shown in FIG. 6, in which a GPS patch antenna 90 receives not only direct path signals 92 from the satellite but also multipath reflected signals 94, 96. The multipath signals 94, 96 represent the signal from the satellite being reflected by a building 98 or some other large object 100, respectively, in the vicinity of the antenna 90.

These secondary signals 94, 96 have been found to have several important characteristics in relation to the primary signal 92. For example, the secondary signals always have a delayed time-of-arrival compared to the primary signal 92, because the secondary signals 94, 96 travel a slightly longer path than the primary signal 92. Furthermore, the respective amplitudes of the secondary signals 94, 96 are nearly always less than that of the primary signal 92, because the reflections are specular and attenuate the signal. In addition, the sense of polarization is reversed by the reflection, and the receiving antenna is not as sensitive to these cross-polarized multipath signals as to the primary signal. For correlation receivers using digital modulation, moreover, multipath code phase signals with delays greater than one chip are completely uncorrelated, and so can be ignored. Finally, the multipath signal distance, that is, the differential path length variation from the direct signal path, varies over the wavelength of both the carrier phase and the code phase. For example, in GPS the carrier phase wavelength is 19 cm ($\lambda$=c/1575 MHz, where c=the speed of light), but the code phase wavelength is much longer, because the code frequency is as low as 1.023 MHz. As a result, the multipath carrier signal can either add to the desired direct signal or subtract from it.

These secondary signals have a deleterious effect on the accuracy of the correlation receiver. For example, because multipath signals are replicas of the incoming direct signal and its code, and the principal or primary autocorrelation function is generated by examining the incoming direct signal and the locally generated signal, each multipath signal generates its own secondary autocorrelation function with respect to the locally generated code. The secondary autocorrelation functions will always have lower maximum amplitudes than the correlated primary signal and will always be delayed relative to the primary signal. This phenomenon is illustrated by way of example in FIG. 7. The secondary or multipath signals generate a series of secondary autocorrelation functions 102, 104 and 106 that are smaller than and are delayed relative to the primary autocorrelation function 108. The primary and secondary autocorrelation functions add by superposition, and the resulting net autocorrelation function is shown at 110 in FIG. 7. It should be noted that because the carrier multipath signals can also subtract from the primary signal rather dramatic distortions can be induced in the direct signal autocorrelation function. Also, because of the rounded autocorrelation function curve due to the finite-bandwidth filters, the indicated peak of the composite autocorrelation function may move in time. Therefore, when using the conventional early-late gate method, such distortions translate directly into errors in the steering control or error function for the delay-locked loop and result in erroneous estimates of local code phase and therefore erroneous estimates of pseudo-range.

The adverse effects caused by these multipath signals is readily appreciated by comparing curves 80' and 82' of FIG. 8 with the respective curves 80 and 82 of FIG. 5. Such comparison will reveal that in FIG. 5 the true autocorrelation function peak occurs when the error is zero at 21 time units, whereas in FIG. 8 the peak is falsely indicated to occur by the zero crossing of the error function 80' at 22 time units. This error is introduced because the composite autocorrelation function has experienced a change in the apparent time that a predetermined and fixed amplitude level is intercepted by the early-late gate correlation method.

FIG. 9 illustrates a composite autocorrelation function with additive multipath distortions. In FIG. 9, the uncorrupted autocorrelation function has its arbitrary amplitude, early- and late-gate times identified at E and L, respectively. The delayed multipath signals cause the composite autocorrelation function 112 to have a larger voltage level at the true late-gate time point L (17 time units) as shown at 121. It takes a little time (about one time unit) for the composite autocorrelation function amplitude to fall to the prescribed voltage at level L' normally associated with the true late time point L. As can be seen from FIG. 9, the corrupted autocorrelation function 112 falls to the predetermined level 0.6 at 18 time units. The timing error at is the time difference between L and L' which in this example is one time unit. While the magnitude of this error is small, it is still significant, and can therefore cause an error in the determination of the true time of signal arrival.

The absolute positioning accuracy of a GPS navigation solution is essentially limited by systemic errors in the satellites and other signal degrading influences such as doppler offsets, ionospheric effects and other causes. The GPS specification is such that users heretofore can get position fixes to a three-dimensional accuracy of about 100 meters. The magnitude of the multipath effect has a maximum of around 10 meters for coarse acquisition (C/A) code and 5 meters for precision code. Therefore, in the navigation mode the multipath error is largely masked by other system errors. Differential and survey applications of the GPS remove satellite-based systemic effects by differencing between two co-located receivers, in which two receivers are located approximately 10 to 50 feet apart in order to get another set of equations relating to satellite uncertainties. In these applications the largest error source affecting the pseudo-range, after receiver and ionospheric effects have been removed, is caused by multipath signals. The objects that are the source of multipath error are dependent on the environment in which the receiver has to operate and are therefore difficult to predict. Previous attempts at substantially reducing the adverse effects of multipath by altering the antenna characteristics of a receiver have not provided a consistent solution and often are very expensive.

The differential survey method achieves a relatively high accuracy from measurements based on the carrier phase of the received signal. Because the wavelengths of the two GPS frequencies are small, 19 and 24 cm, respectively, accuracies of much less than 1 m are possible. The problem with a time-of-arrival measurement based on carrier phase is that the time-of-arrival of each carrier phase cycle is ambiguous, that is, one carrier cycle cannot be distinguished from any other carrier cycle. Previously proposed post-processing techniques typically have required that the two receivers remain stationary for about one hour, so that this carrier cycle ambiguity can be resolved. Thus, multipath-induced errors of 3 to 10 meters are a major stumbling block to decreasing measurement time.

It has also been proposed to use the pseudo-range to resolve the carrier phase ambiguity, thereby allowing the ambiguity to be resolved much faster. The ability of a receiver to utilize pseudo-range to resolve the carrier cycle ambiguity, however, is based on the quality of the pseudo-range measurement. Unfortunately, multipath signals bias the pseudo-range so that the wrong carrier cycle is often chosen when resolving the carrier cycle ambiguity. One possible technique to prevent choosing the wrong carrier cycle is to rely on the fact that the multipath may average out over a period of time. This technique, however, requires the multipath magnitude and direction to change substantially during this period of time. That is, it relies on extensive satellite or user movement.

Other proposed techniques to compensate multipath effects in receivers rely on more commonly understood channel equalization techniques, however, none of these techniques makes use of measurements from the autocorrelation function. Instead, these techniques rely on a less accurate form of channel characterization. For example, U.S. Pat. No. 4,829,543 describes a technique for correcting the multipath effects applicable to digital data demodulation in a Time-Division Multiple-Access (TDMA) data transmission system. TDMA systems operate with regularly repeated short-duration bursts of data and differ in that respect from the Global Positioning System, however, the method of the above-mentioned patent discloses a correlation receiver for this burst start-up sequence. As described in the above-mentioned patent, a known sequence of data bits is transmitted as part of a TDMA burst preamble from which the receiver derives an estimate of the correct time to start demodulation of the data. The system then re-estimates the time to start demodulation in the TDMA system at each time slot of TDMA transmission. While that approach has merit in improving demodulation by obtaining a new and better estimate of the carrier phase timing for each time slot of transmission, it does not address multipath effects on the burst preamble itself.

It can be recognized that removing multipath effects would avoid the delays inherent in the need for averaging periods and would essentially allow signal ambiguities to be resolved instantly. This would result in large time savings for surveyors. In other words, if multipath were removed surveyors would be able to obtain high-quality pseudo-range data in an instant.

OBJECTS AND SUMMARY OF THE INVENTION

Accordingly, it is an object of the present invention to provide an improved signal timing synchronizer for use with correlation type receivers that can eliminate the above-noted defects inherent in previous synchronizing systems.

It is another object of the present invention to provide a method and apparatus for compensating multipath effects on the time-of-arrival measurement in a correlation receiver.

A further object of the present invention is to provide a method for improving the accuracy of signal time-of-arrival measurements in correlation receivers in the presence of distortions, caused by any source, in the composite autocorrelation function.

A still further object of the invention is to provide a method for improving the speed with which a signal time-of-arrival measurement can be made in a correlation receiver by eliminating the effects of multipath and any other distortions in real time, and in which the determination of the pseudo-range is made accurately within a very short time in comparison to previously proposed techniques. More specifically, previous spread spectrum receivers do not use information available in the distorted autocorrelation function and are biased due to distortions thereof caused by multipath effects. In contrast, the present invention uses such information to advantage. It has been found that the number of errors made by detectors due to multipath may be effectively reduced where the receiver is in sync with the incoming data stream.

Because the present invention can ameliorate the effects of multipath in real time, it has widespread use in voice/data communications systems that suffer from multipath. It is, therefore, a further object of the invention to provide a method for eliminating the effects of multipath in personal communications network (PCN) systems and vehicular communications systems by incorporating an improved timing synchronizer into suitable spread spectrum demodulators.

Another aspect of the present invention is the provision of a method for detecting time variations ($\Delta T$) between early and late gate timing points of corrupted and uncorrupted autocorrelation functions. Such a method can be implemented principally in either hardware or software, as desired. In hardware, for example, a second pair of correlators may be employed, referred to herein as "scanning" correlators. Scanning correlators, when utilized, need not be driven in synchronism with the Early-Late-Punctual correlators. Instead, a preferred method according to the present invention steers the clock delay of the scanning correlators independently of the delay/feedback control function for the principal correlators by employing a separate feedback loop, whose control function is to locate a specific voltage level corresponding to the normal autocorrelation function time span $t_N$ (FIG. 9). A measurement of the autocorrelation function time span is compared to the normal time span to determine the magnitude and phase of the multipath-induced error shown in FIG. 9 as $\Delta t_L$. Alternatively, a direct calculation can be used in post processing, because the post-processor normalizes the autocorrelation function time span measurement. Both techniques are described in greater detail hereinbelow.

Thus, the present invention provides to a method and apparatus for estimating the magnitude and phase of the multipath-induced error in the position in time of the peak of the composite autocorrelation function. By estimating the error and then subtracting it from the indicated peak position of the composite autocorrelation function, a better estimate of the true peak time position is obtained. This process, whether implemented in hardware or software, may be performed in real time, thereby substantially reducing the amount of time a surveyor, for example, needs to make a measurement.

The above and other objects, features, and advantages of the present invention will become apparent from the following detailed description of illustrative embodiments thereof to be read in conjunction with the accompanying drawings wherein like numerals represent the same or similar elements.

BRIEF DESCRIPTION OF THE DRAWINGS

For a further understanding of the present invention, reference may be had to the accompanying drawings, in which.

DETAILED DESCRIPTION OF PREFERRED EMBODIMENT

Figure 9:
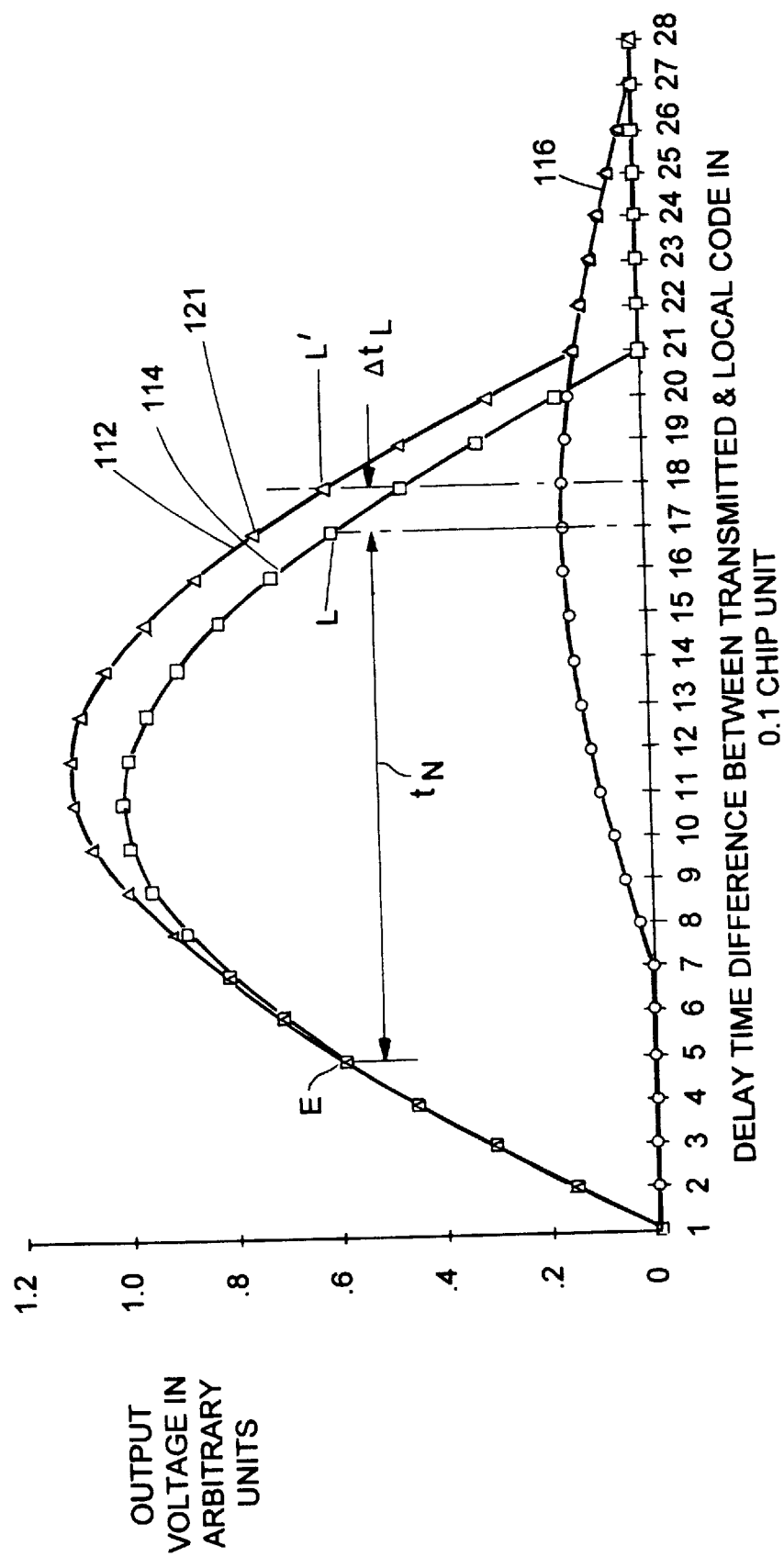
FIG. 9 is a plot of a composite autocorrelation function showing how the autocorrelation function expands due to multipath and showing the timing definitions.

Referring now to the drawings, and in particular to FIG. 9, there is shown a composite autocorrelation function 112 that has been affected by distortions induced by a positive multipath signal 116. In particular, the composite function 112 is shown in expanded form due to the delayed signals being in-phase with the carrier portion of the primary signal. Thus in FIG. 9, for example, as a result of the multipath signal 116 the composite autocorrelation function 112 is expanded in time by one time unit from a direct path autocorrelation function 114 at the amplitude level 0.6.

Figure 10:
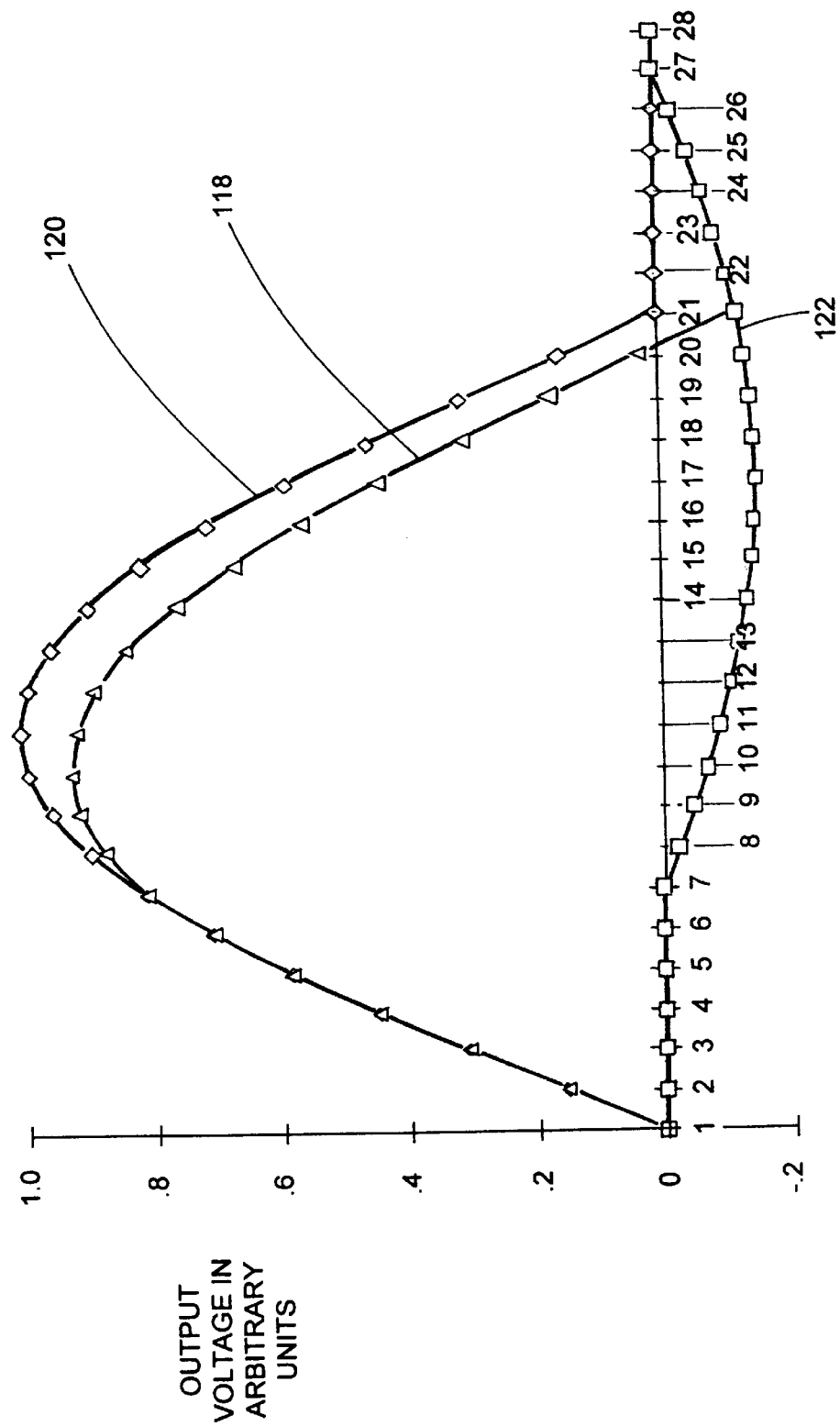
FIG. 10 is a plot of a composite autocorrelation function showing how the autocorrelation function contracts due to cancelling multipath.

In FIG. 10 there is shown a composite autocorrelation function 118 that has been affected by distortions induced by a negative multipath signal 122. The composite function 118 is contracted in time by more than one time unit from a direct path autocorrelation function 120 at the amplitude level 0.6 due to the negative multipath signal. Such contraction of the composite function 118 occurs when the delayed multipath signals are out of phase with the carrier phase of the primary signal.

It has been found that such expansions and contractions of the composite function are not symmetrical and serve to deceive the early-late gate correlation. Variations in the shape of the autocorrelation function, moreover, also cause the position of the true peak to shift in time. Thus, tracking the position of the true peak has not heretofore been feasible.

In accordance with an aspect of the present invention, it has been found that to a first order, the variations in width from the ideal width of an uncorrupted triangular autocorrelation function, as measured at the +½ and the −½ code chip spacing points, correspond very closely to the shifted position of the composite peak from the true peak of the primary signal. In other words, the distorted composite peak moves in direct proportion to the amount of expansion or contraction between the midpoints of the rising and falling slopes of the composite autocorrelation function. Thus, the difference between a multipath-free autocorrelation function time-span $t_N$ (FIG. 9) and the instantaneous time span is equivalent to the shift in the apparent peak time-of-arrival, to a first-order approximation.

Figure 1:
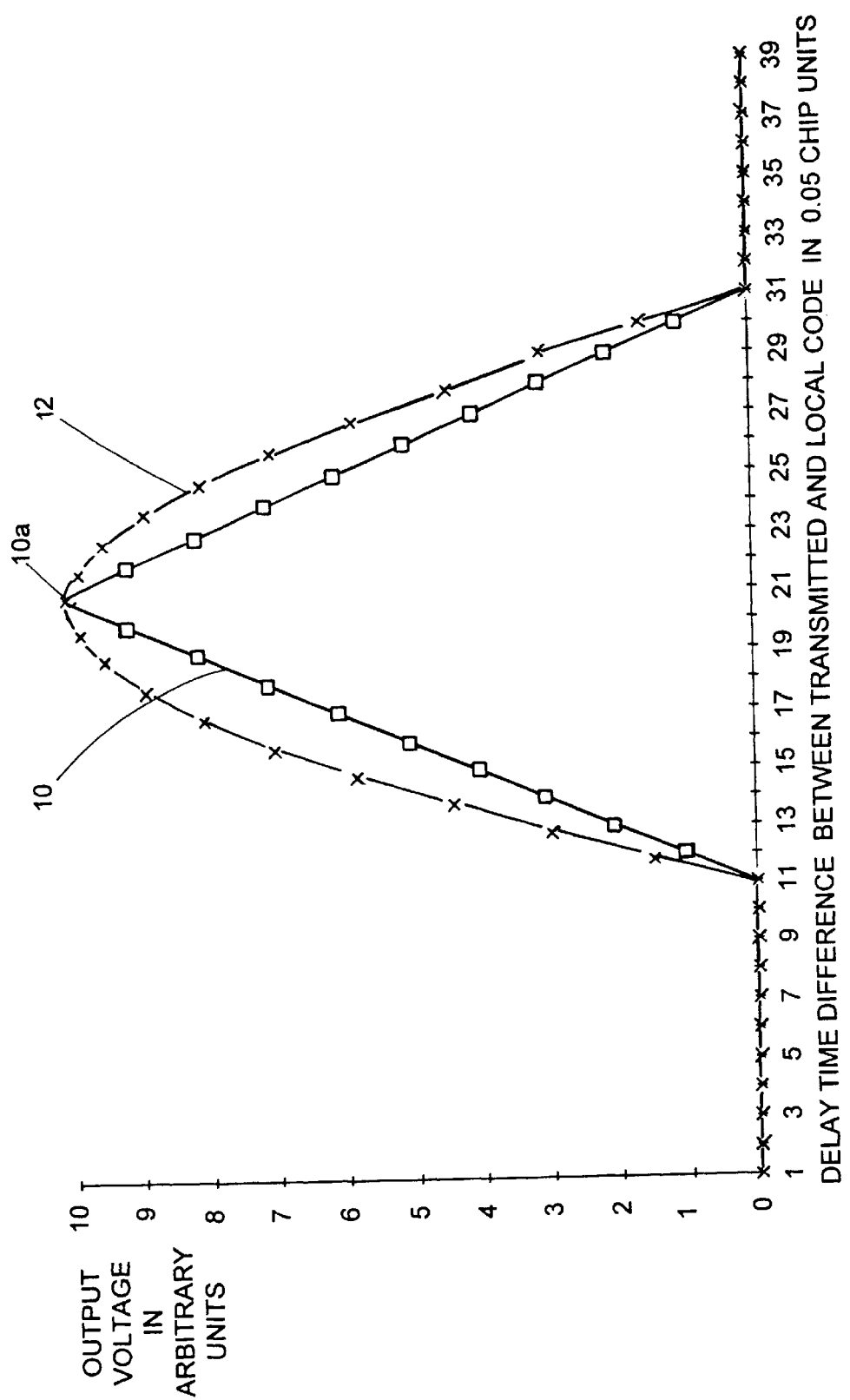
FIG. 1 is a plot of an ideal autocorrelation function representing the relationship between the voltage observed at the output of a correlator and the time delay difference between incoming codes and a locally generated code in a spread spectrum receiver and an actual autocorrelation function with distortions due to finite-bandpass filters.
Figure 2:
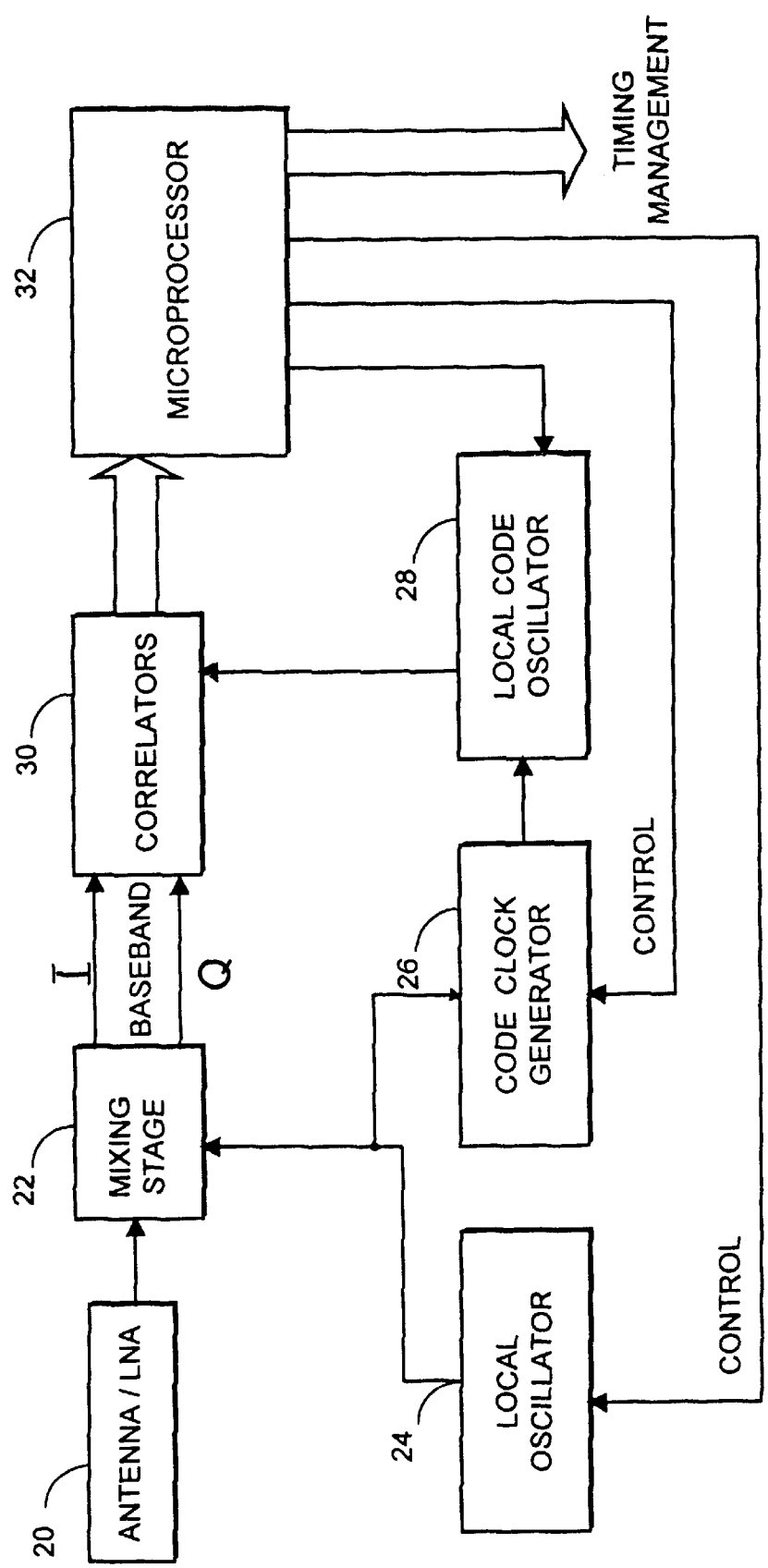
FIG. 2 is schematic in block diagram form of a previously proposed correlation receiver.
Figure 3:
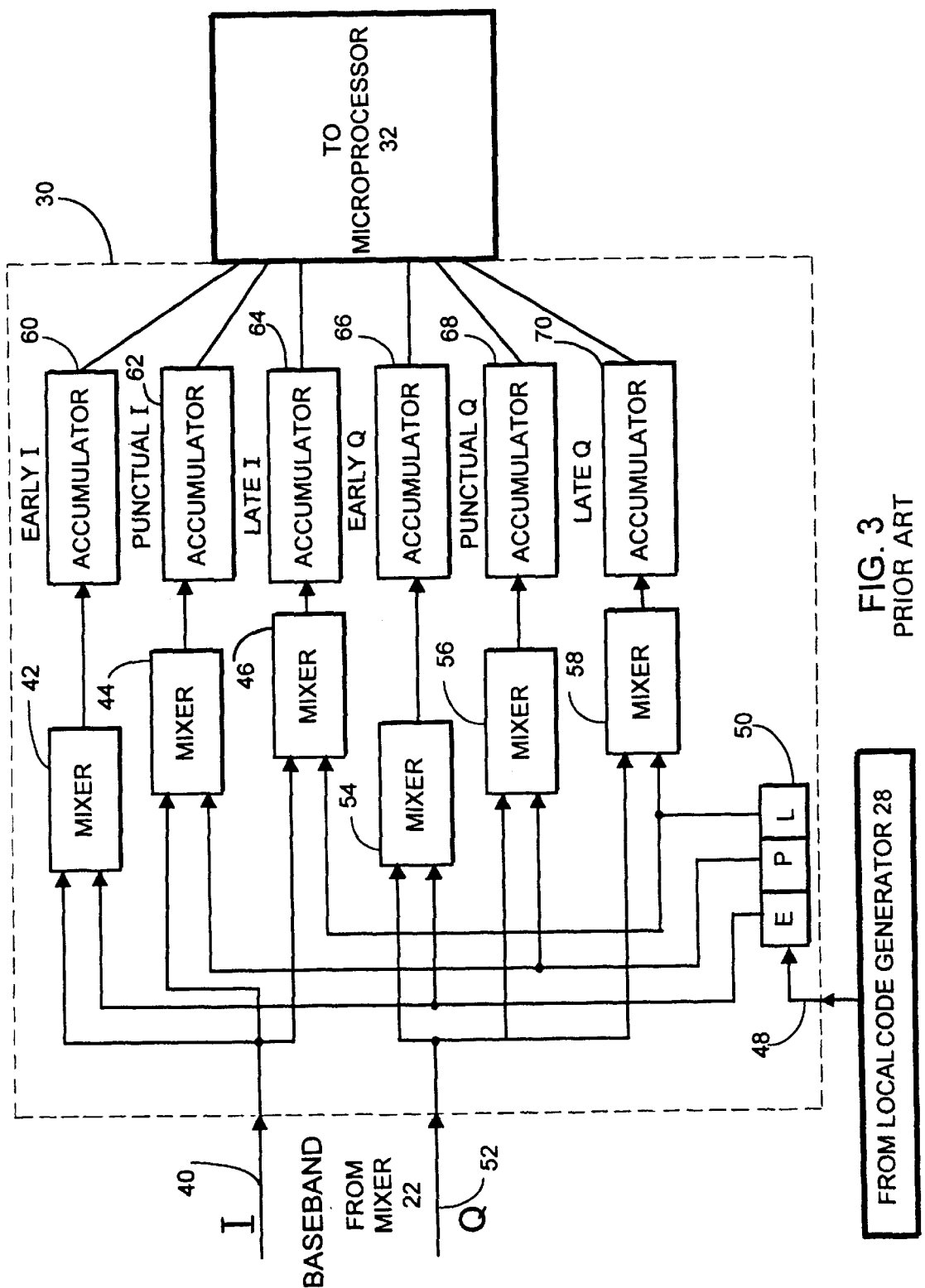
FIG. 3 is a schematic in block diagram form of the correlators used in the correlation receiver of FIG. 2.
Figure 4:
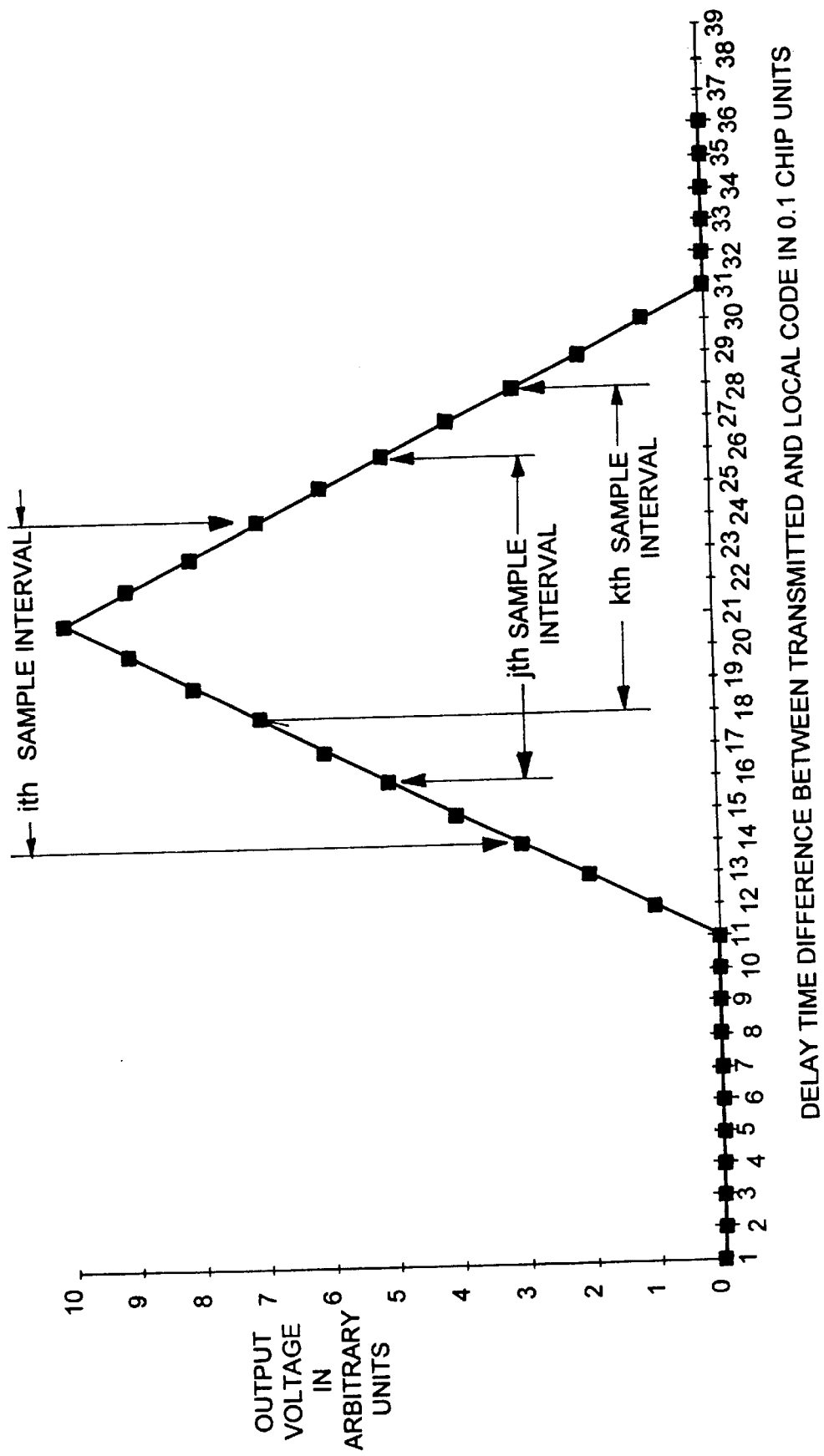
FIG. 4 is a plot showing scanning the autocorrelation function with early-late gate correlators to develop an error control function.
Figure 5:
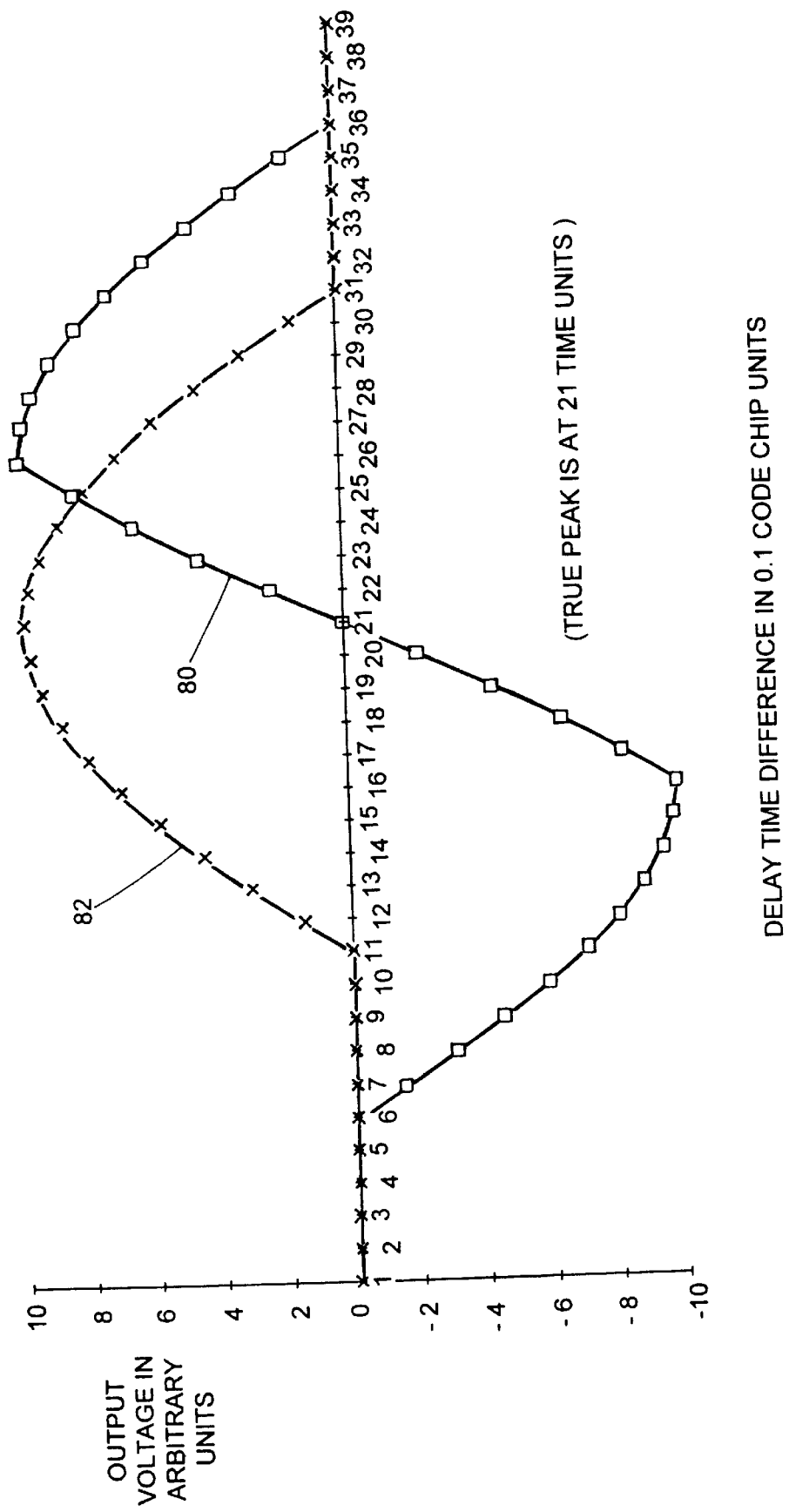
FIG. 5 is a plot of the error control function derived from 1-chip separation of the early-late gate correlators.
Figure 6:
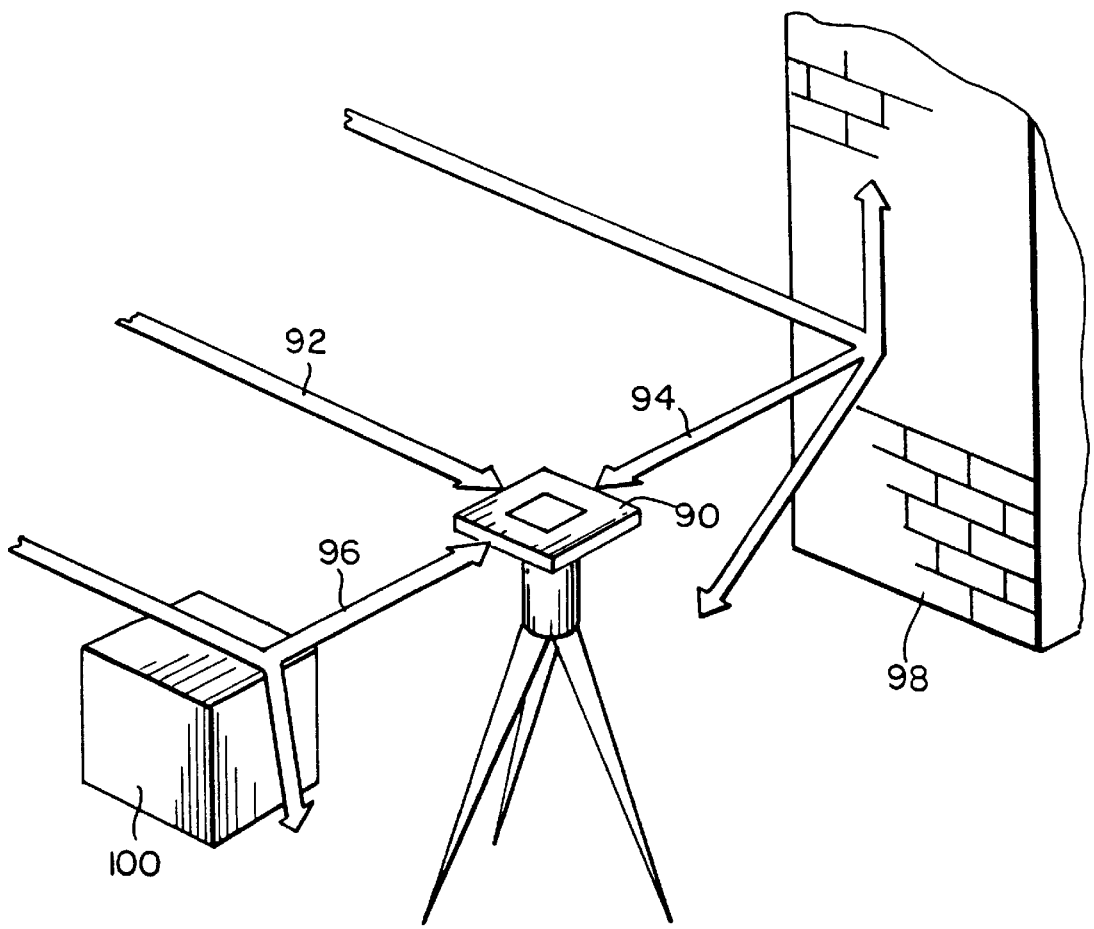
FIG. 6 is a perspective view showing a typical arrangement for a surveying GPS receiver that experiences multipath.
Figure 7:
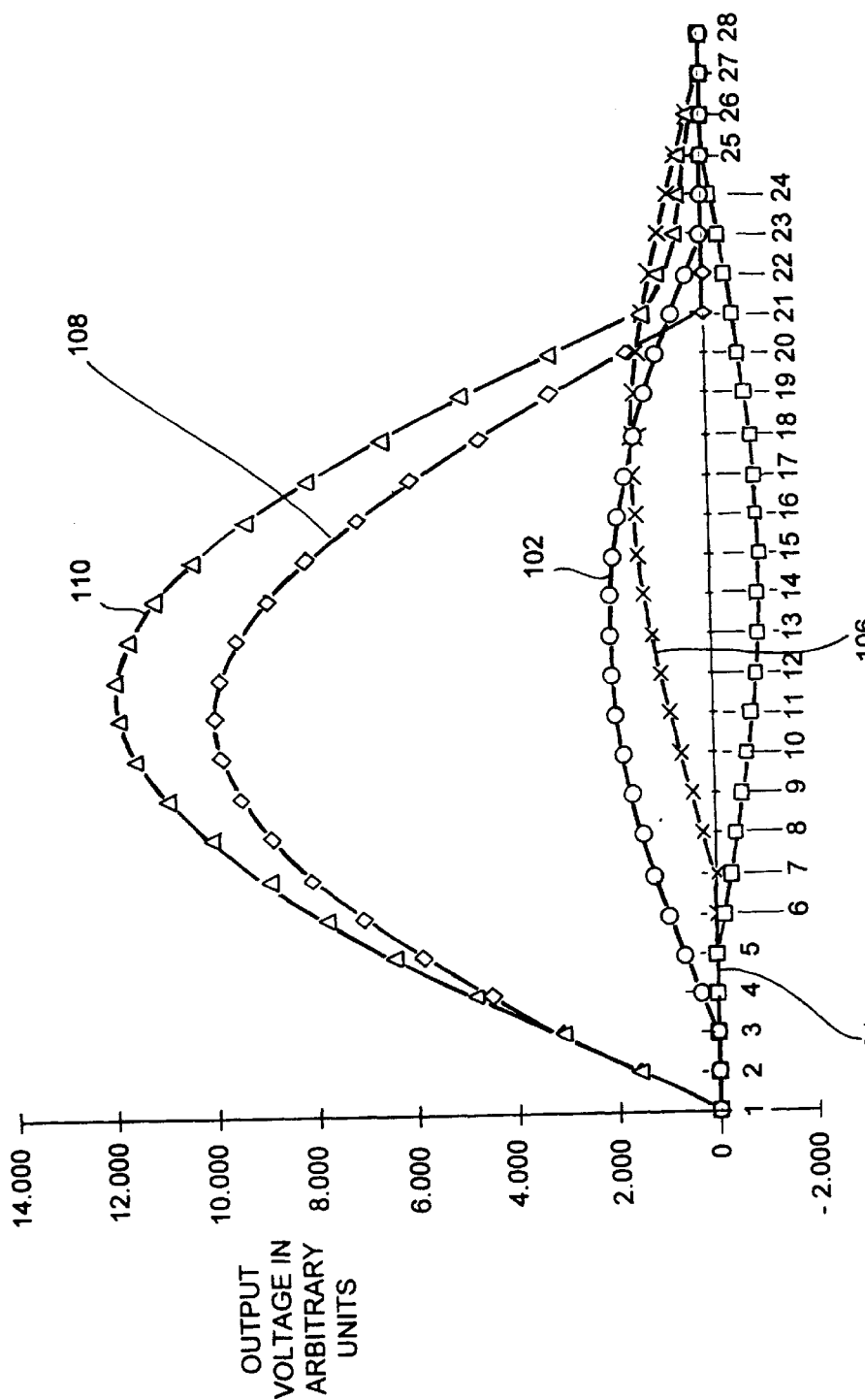
FIG. 7 is a graphic illustration of the instantaneous, composite, autocorrelation function that occurs in the presence of multipath interference.
Figure 8:
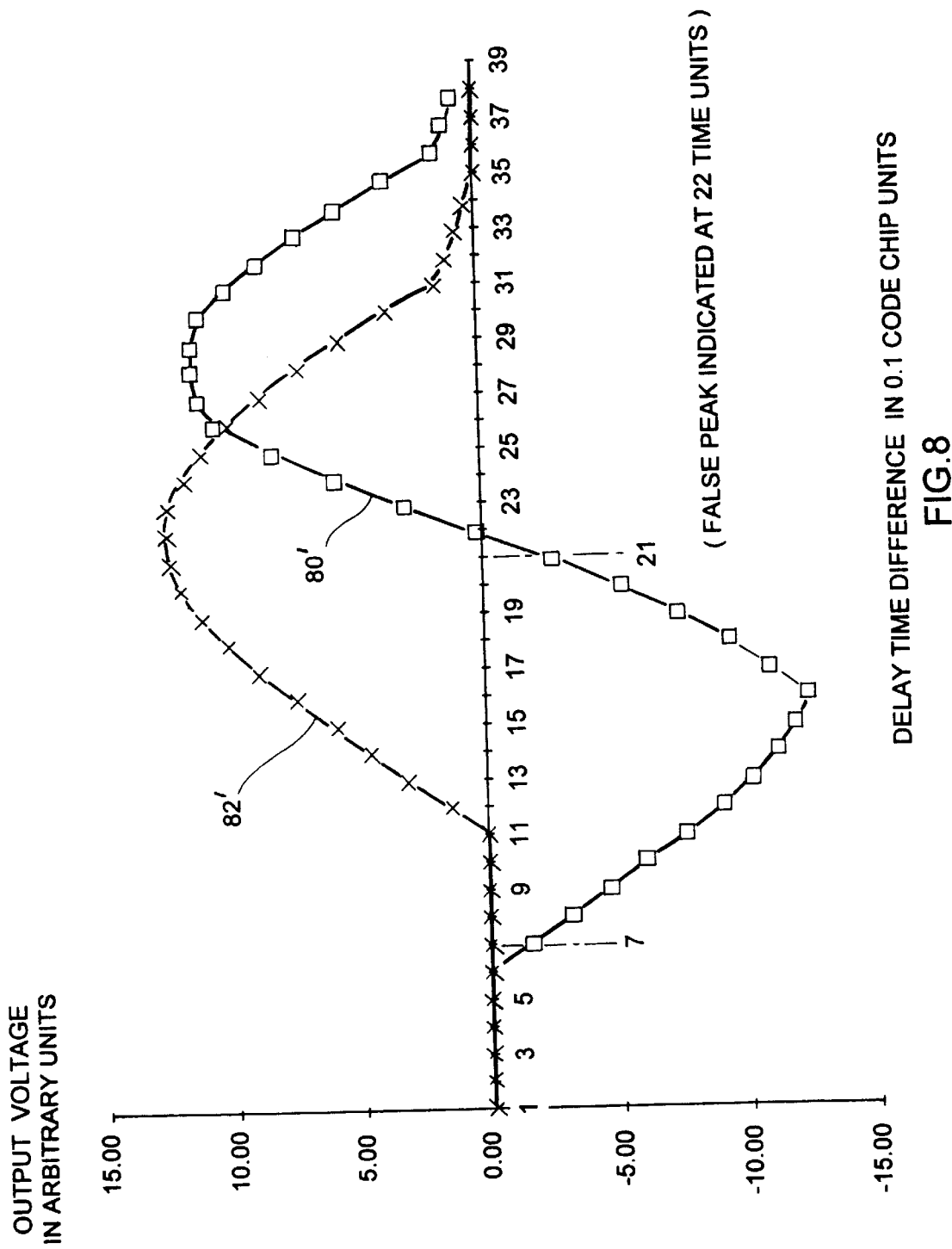
FIG. 8 is a graphic illustration of distortions in the autocorrelation function that occur due to multipath signals, along with the error introduced in the steering control function.
Figure 11:
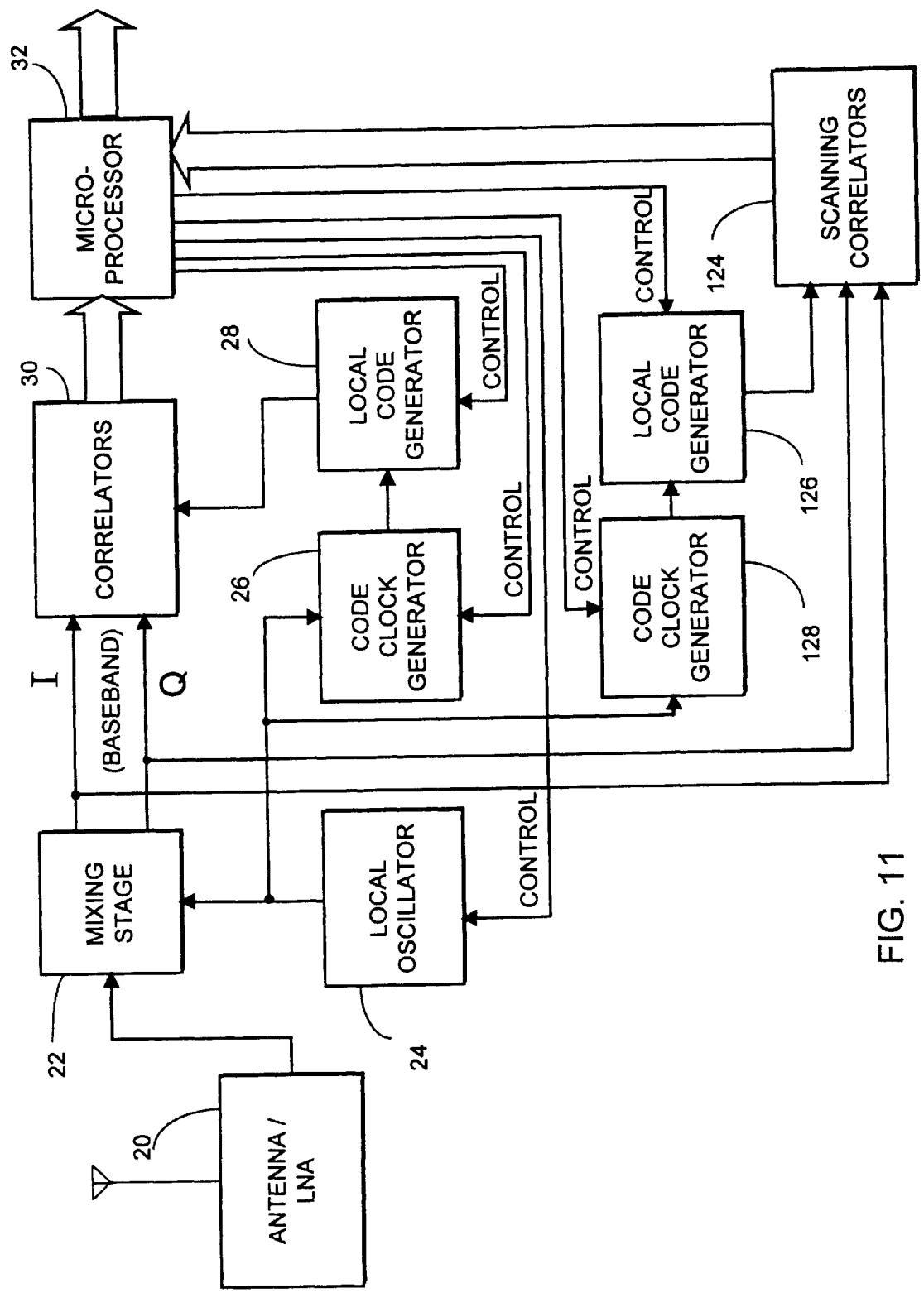
FIG. 11 is a schematic in block diagram form of a receiver with a standard correlator and a pair of scanning correlators according to an embodiment of the present invention.

Referring now to FIG. 11, one embodiment of the present invention for determining the position in time of the autocorrelation peak under multipath distortion provides a standard correlation receiver of the type depicted in FIG. 2, together with a pair of correlators 124, referred to as scanning correlators. The scanning correlators 124 correlate the incoming code that is present in the in-phase (I) and quadrature (Q) signals from the baseband mixer 22 with a local code produced by a second local code generator 126 and code clock generator 128 that are independent of the clock and code generators 26, 28 normally used to drive early, punctual, and late correlators 30 of the type shown in FIG. 3. Code clock generator 128 and local code generator 126 have their respective timing controlled by the microprocessor 32 (FIGS. 2, 3 and 11) separately and independently of the timing control of the code clock generator 26 and the local code generator 28. (FIG. 2). Hence, the scanning correlators 124 are free to scan the autocorrelation function for the autocorrelation function time-span amplitude independently of the normal code and carrier tracking process. A suitable hardware implementation may, for example, involve three code-numerically-controlled oscillators along with five in-phase channel correlators.

Figure 13:
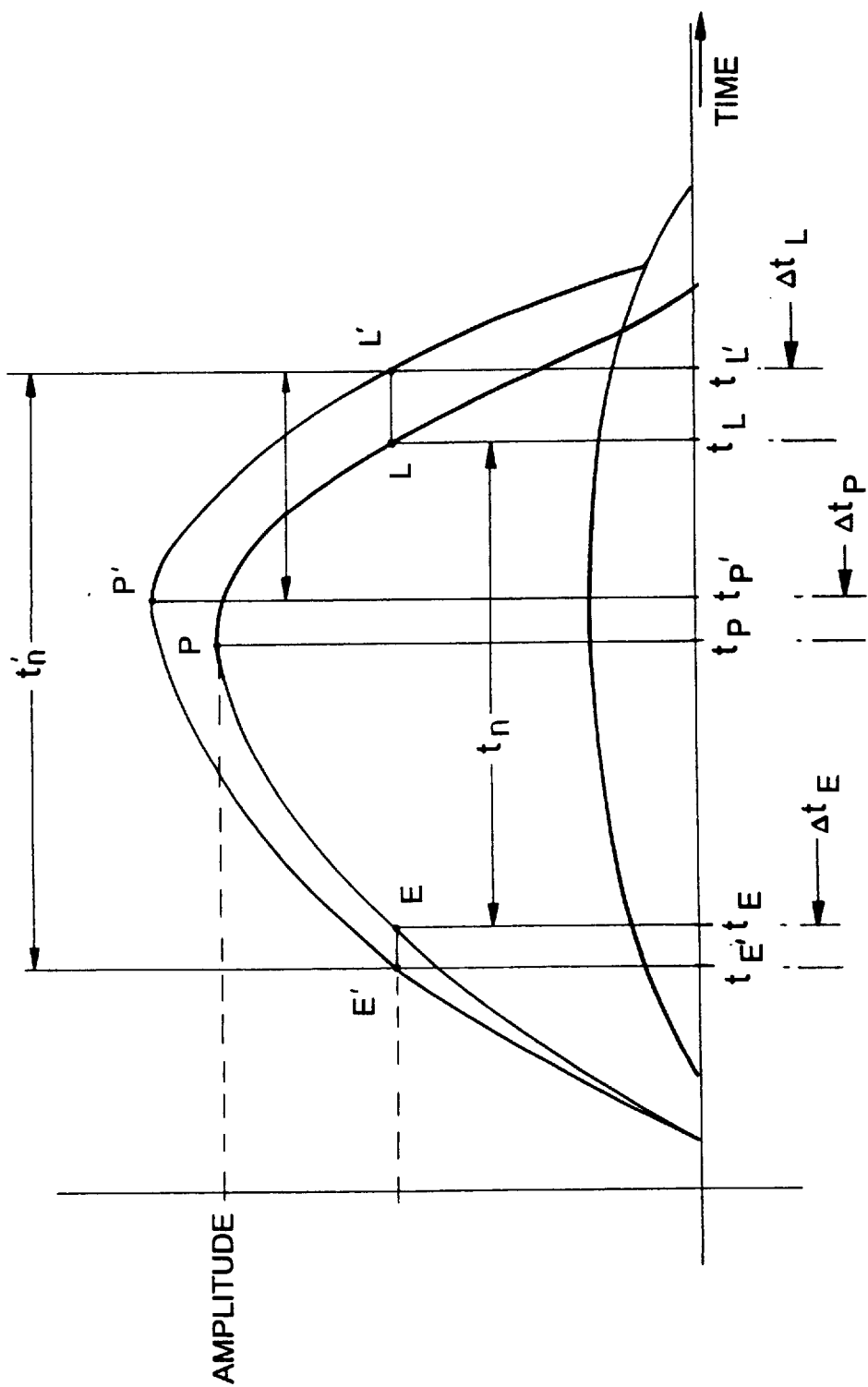
FIG. 13 illustrates the method used to eliminate the multipath effects that shift the peak of the autocorrelation function.

In practice, the usual code tracking loop is performed with the three correlators, that is, an early-late delay lock loop is performed. In this way nominal early (E), late (L) and punctual (P) points may be determined (FIG. 13). The fact that the conventional code tracking loop has been closed means that the normal punctual correlator will be close to the true peak, typically within ¹/₁₀th of a chip to the true peak. It should be noted that in normal code tracking one codenumerically-controlled oscillator and three correlators are preferably used.

The next step in the hardware embodiment is to create another tracking loop, which could be implemented in hardware or in software using the microprocessor, that uses this information inherent in the distorted autocorrelation function to determine the multipath-induced timing errors, $\Delta t_E$ and $\Delta t_L$. The scanning correlators 124, for example, a numerically-controlled oscillator and a correlator (1+1), may be used to track another early point E', as shown in FIG. 13. Thus, with the scanning correlators, the instantaneous voltage value at the Early time E' on the distorted autocorrelation function is known and this provides a measure of the time width of the composite autocorrelation function timespan. Any variations from the normal value are either subtracted or added to the early-late gate correlator estimate of the time of arrival.

This calculation may be done by relating the voltage at the E' timing point determined by the scanning correlators to the voltage at the Punctual timing point P, which is determined by the Early-Late-Punctual correlators. In an undistorted autocorrelation function, E' can be set equal to 0.6 P. By creating a tracking formula given by 0.6P–E'=0 volts, and then driving the scanning correlators by controlling the timing of the local code generators so that their relative clock phase finds the time that keeps this error function at zero volts, the true time difference between E' and P can be determined. The time difference between E' and P is a measurement of the expansion/contraction of the early side of the composite autocorrelation function. A similar measurement may be done at the late time point L', if desired, resulting in a measure of the expansion/contraction of the late side of the composite autocorrelation function.

FIG. 13 represents the autocorrelation function with additive multipath and having the significant timing events marked. As will be seen from FIG. 13, $t_n$ is always known because it is derived from $t_L-t_E$. On the other hand $t_E$, and $t_L$, are found using the scanning correlators.

Since the multipath signal is delayed slightly compared to the direct signal, the expansion on the leading edge of the autocorrelation function at the Early time point (E') could be less than the expansion on the trailing edge at L'. The error in the true peak time of arrival $\Delta tp$ is given by the difference between the error in the Late time of arrival and the Early time of arrival, thus:

$$\Delta tp = f(t_L, t_E)$$

where this function is experimentally determined. To a first approximation, the foregoing function can be thought of as the difference between the duration of the measured early and late times of arrival and the standard ½ code chip time duration, but the yield from such an approximation is affected by the constantly varying levels and non-linearities in the processing. The function $f(t_L, t_E)$ may, however, be determined experimentally and thereby also yield the significantly improved results presented in FIG. 12.

It should be noted that the value 0.6 used to determine a correct tracking point is an arbitrary choice, and that values anywhere in the range of 0.55 to 0.70 should provide improved results sufficient to determine the true peak timing point.

Figure 12:
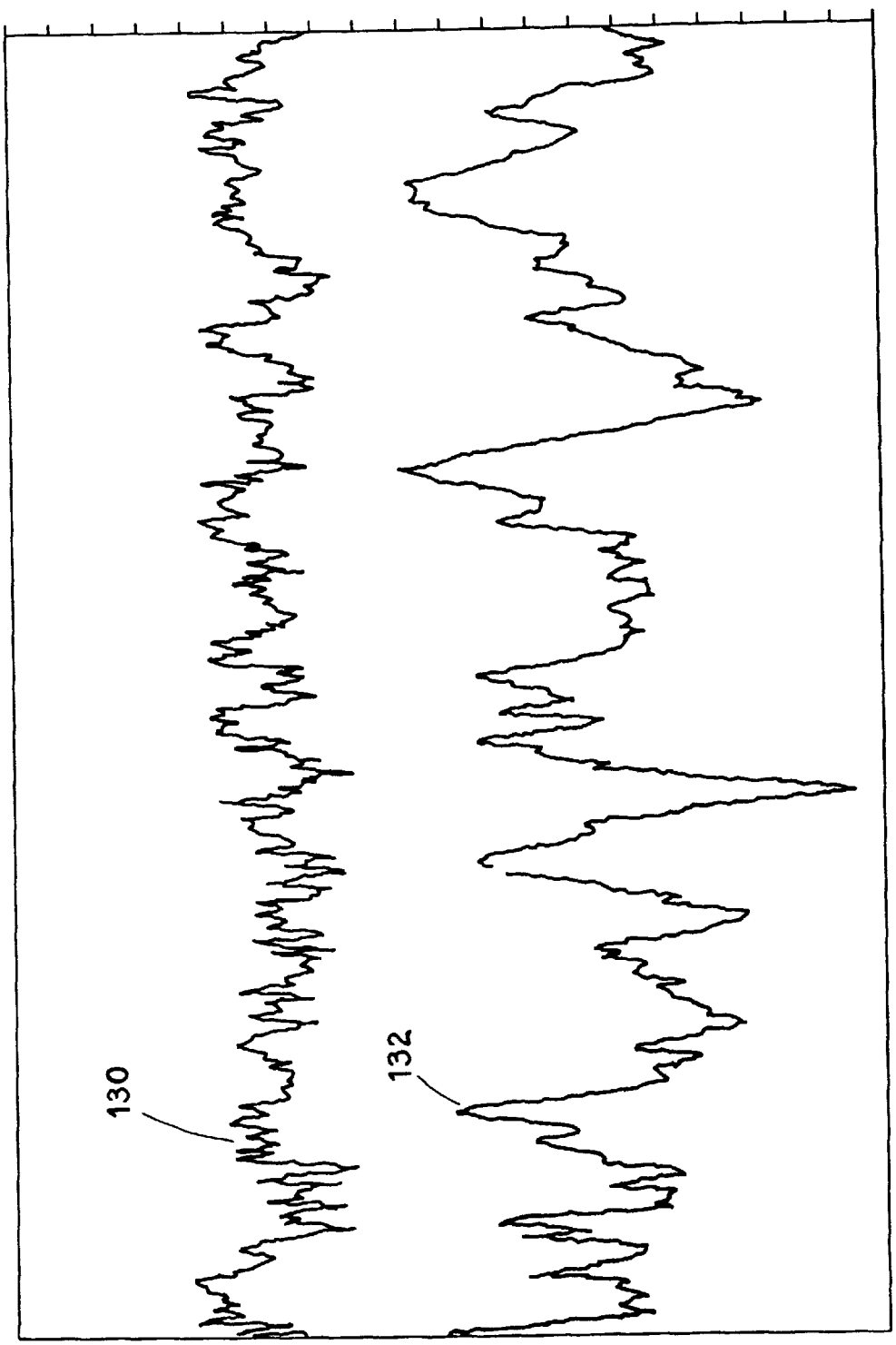
FIG. 12 is a plot illustrating the reduction in the effects of multipath using the system of FIG. 11.

The dramatic improvement in the estimate of time-of-arrival due to subtracting the estimate of the multipath-induced distortions using the embodiment shown in FIG. 11 is represented in FIG. 12, in which the plotted traces are generated from measured data using the embodiment of FIG. 11. The advantages of the invention are clear from this plot of measured data showing a real-time calculation of pseudo-range in the presence of multipath with the present invention, as curve 130, and without the invention, as curve 132.

The present invention is also applicable to cross-correlation where instead of correlating the transmitter code with a local code, two transmitter codes, transmitted on different carrier frequencies, are correlated with each other in the receiver. Typical cross-correlation techniques are disclosed in U.S. Pat. No. 4,463,357 and are known to generate an autocorrelation peak. Thus, the present invention could be employed together with cross-correlation techniques to improve either the performance of a time of signal arrival measurement in the presence to multipath, or the bit error rate in a spread-spectrum demodulator.

Figure 14:
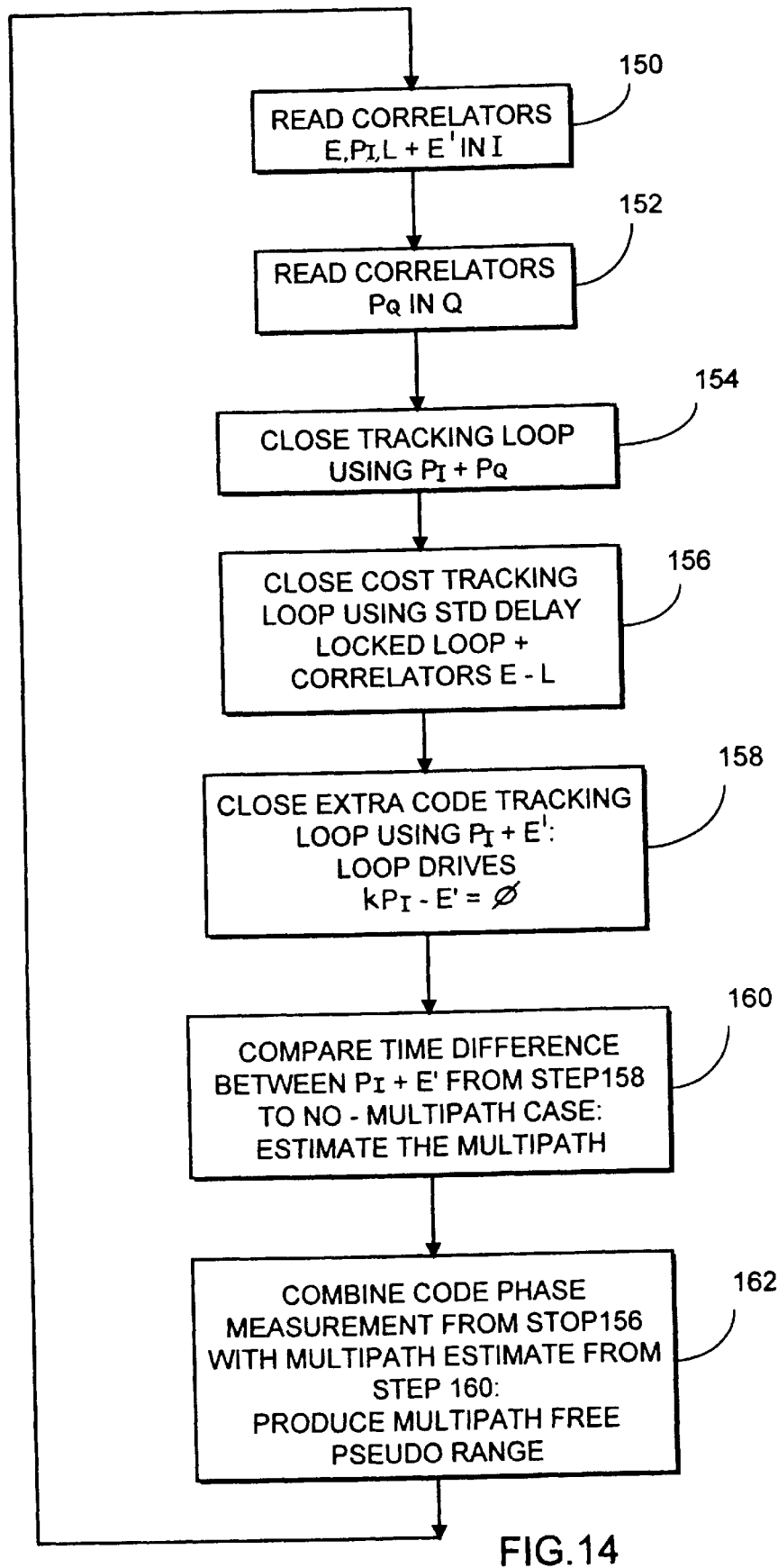
FIG. 14 is a flowchart showing the steps to be followed to eliminate multipath effects, according to an embodiment of the invention.

FIG. 14 shows steps that may be followed in performing a measurement of the multipath effects in accordance with the present invention. More specifically, and also referring to FIG. 13, step 150 represents the reading of the correlators to obtain the values of the points E, $P_I$, L, and E' relative to the in-phase signal (I). Following that measurement the punctual value $P_Q$ for the quadrature signal (Q) is determined. The carrier tracking loop can then be closed using the values $P_I$ and $P_Q$ in step 154 using a filter phase equal to $\tan^{-1}(P_Q/P_I)$.

The code tracking loop is then closed as shown in step 156 using the delay-locked loop approach and the early and late correlators. This means that the control signal from the microprocessor causes the local code generator to reach the 0.6 value on the curve, so that the delay used to reach that value can be determined. It is this tracking loop closing that suffers from the multipath and it is the current local code phase, or time delay, that gives the pseudo-range. Using the preferred embodiment, the loop is closed on the first code-numerically-controlled oscillator, which shifts E, $P_I$, L, and $P_Q$ together. The extra code tracking loop may then be closed using the values $P_I$ and E' as represented in step 158. This loop is closed on the second code-numerically-controlled oscillator, which controls the phase of E'. This is where the multipath estimate is generated. Driving $kP_I$-E' to 0, where k is currently set at 0.6, permits the distance between $P_I$ and E' to be measured in time, thereby providing an estimate of the expansion/contraction of the autocorrelation function due to multipath. Then, the time difference between $P_I$ and E' that is obtained from the preceding step 158 is compared to the situation when no multipath is present and the multipath measurement is then estimated.

It should be noted that satisfactory results may be obtained where only the early point E' is utilized. Where desired, such an embodiment would reduce the amount of hardware involved. It will be understood by those skilled in the art, however, that an expanded version of the present invention could employ the L' measurement as well.

The result of the code phase measurement of step 156 is then combined with the multipath estimate in the preceding step 160, thereby producing a multipath free pseudo-range. In the preferred embodiment and using commercially available components, the calculations from step 150 through step 162 can be performed in one millisecond.

The foregoing embodiment has been described in connection with presumed distortion to the autocorrelation function in which the amplitude of the peak of the autocorrelation function at any given instant of time is fixed, while the delay of the scanning correlators is varied using the microprocessor to control the timing to determine the actual time of arrival of the Early and Late voltage levels. Such a version of the present invention may be referred to as a Fixed-Amplitude Variable Time version. It will be understood that it is also possible to reverse the two variables and use a Fixed-Time Variable Amplitude method to determine the multipath error. In such an embodiment it is recognized that the amplitude may vary from instant to instant, but that the amplitude at the Early or Late time instants should be 0.6 that of the Peak when no multipath is present. With additive multipath, for example, it is known that the level at the proper early or late time instant will be higher, say 0.7 that of the peak at the punctual time instant. The magnitude of the correlation in time Δtp as a function of this change in voltage at the Early-Late correlator outputs, may be determined as follows:

$$\Delta tp = f(V_E, V_L)$$

This method does not need the scanning correlators to determine any other time of arrival; it relies extensively on predetermined effects of multipath on the correlator outputs. This method utilizes the fact that in normal code tracking the E, P, and L correlators are driven from the same code numerically-controlled-oscillators and the time difference between them is fixed and known. Therefore, multipath cannot vary the time difference between the E and L in this case and the distortion takes the form of an amplitude change. This amplitude change can be expressed as a function of the amount of multipath present.

One technique for determining Δt is as follows. A multipath simulator may be utilized to create a delayed, attenuated version of the original signal obtained from a GPS satellite simulator. The multipath simulator preferably consists of a power splitter, a variable length of transmission line with a variable delay line in series, a fixed length of transmission line, and a second power combiner. By adjusting the variable length of transmission line and attenuation, variable amounts of multipath error can be introduced into a GPS receiver. For each increment of multipath error, measurements of Δt and $V_E$ can be made and a table can be constructed for storage in memory of the GPS receiver. The process is repeated for measurements with Δt and $V_L$. This entire process can be repeated again for determination of Δt as a function of $t_L$ and $t_E$.

Typical Table Δt = f($V_E$) + f($V_L$)

| f($V_E$) | $V_E$ | f($V_L$) | $V_L$ |
|---|---|---|---|
| 1.00 | 1.00 | 1.00 | 1.00 |
| 1.32 | 1.25 | 1.40 | 1.25 |
| 1.60 | 1.50 | 1.66 | 1.50 |
| 1.85 | 1.75 | 1.92 | 1.75 |

Figure 15:
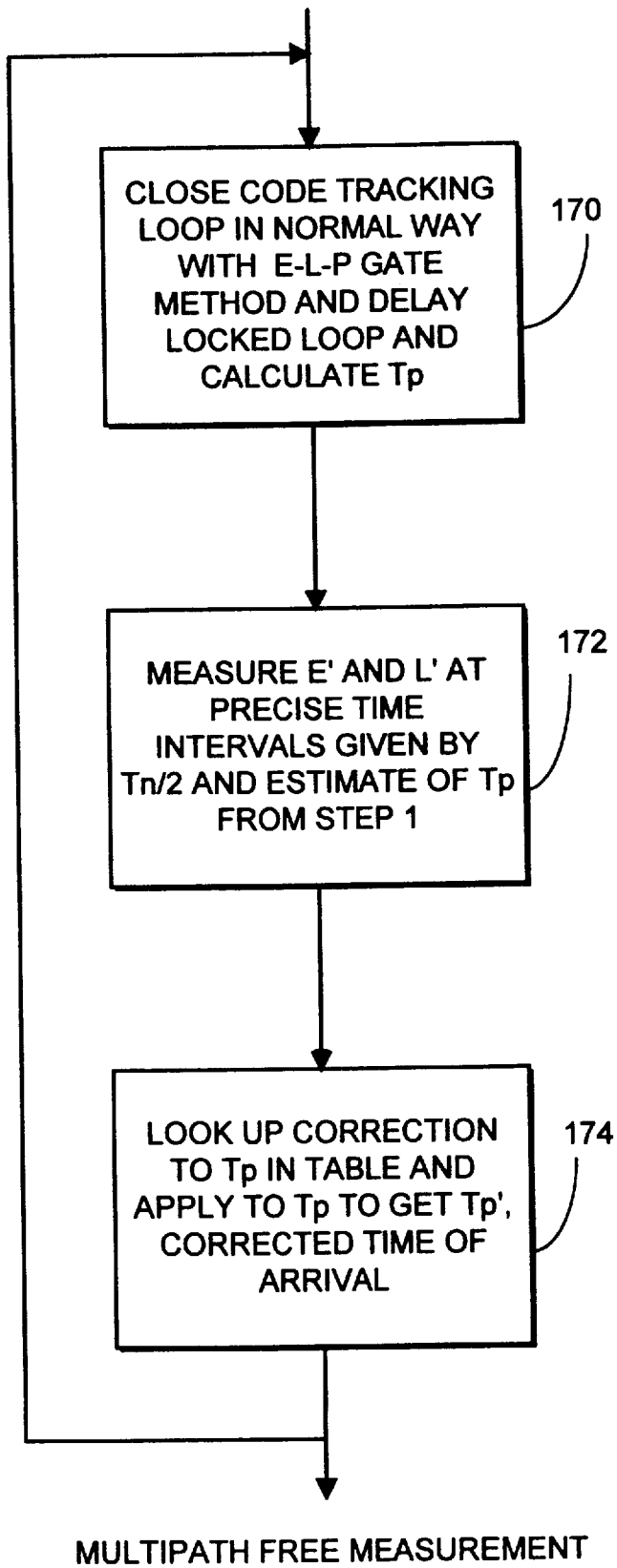
FIG. 15 is another flowchart showing the steps to be followed to eliminate multipath effects, according to another embodiment of the invention.

FIG. 15 shows a flowchart for software suitable to make the correction using the technique of Fixed-Time Variable-Amplitude. The process starts at step 170 with closing the normal tracking loop that finds a distorted estimate of the true time of arrival. The second step 172 of this technique is to measure the actual voltages at the times of $t_E$, $t_p$, and $t_L$. In step 174, a series of predetermined voltage measurements embedded in a look-up table may be addressed to obtain a correction factor that is applied to the results of step 170. The results in a multipath-corrected estimate of the time of arrival. These predetermined voltage measurements take into account the nonlinearities of the system.

It is extremely important to note that this correction process may be done in real time, at the same time that the code tracking loop is closed, in order to use the information already present in the distorted autocorrelation function. Post processing is not known to reveal such corrections.

The above description is presented by way of example only and is not intended to limit the scope of the present invention. For example, various changes and modifications to the embodiments as depicted herein may be made by those persons skilled in the art without departing from the scope of the invention. While the exemplary embodiments are directed toward the field of GPS/Survey, the present invention will find utility in other fields as well. The scope of the invention is not to be limited except as set forth in the appended claims.

What is claimed is:

1. A method of synchronizing to a reference signal the timing of a received composite signal consisting of a preferred, interference-free signal distorted by at least one interfering signal, to determine an undistorted timing of the preferred signal, the method comprising the steps of:

generating points on a correlation function representative of a timing relationship between the distorted composite signal and the reference signal;

determining a nominal peak amplitude and the location in time of the nominal peak amplitude of said correlation function;

determining the location in time and amplitude of a first point that is displaced from said nominal peak on said correlation function relative to said nominal peak;

determining the location in time and amplitude of a second point that is displaced from said first point;

determining a displacement of said first point relative to said second point; and identifying said displacement with the displacement in time required to synchronize the timing of the reference signal to said received composite signal.

2. The method of claim 1, wherein said displacement of said first point relative to said second point is a displacement in time.

3. The method of claim 1, wherein said displacement of said first point relative to said second point is a displacement in amplitude.

4. The method of claim 3, further comprising the step of choosing said first point and said second point to have an amplitude which is a fraction of said nominal peak amplitude.

5. The method of claim 4, wherein said fraction is within the range of 0.55 to 0.70.

6. The method of claim 5, wherein said fraction is 0.65.

7. The method of claim 1, wherein:

said location in time of said first point is less than said location in time of said nominal peak amplitude; and said location in time of said second point is greater than said location in time of said nominal peak amplitude.

8. Apparatus for synchronizing to a reference signal the timing of a received composite signal including a preferred, interference-free signal and at least one interfering signal, the apparatus comprising:

correlation means for generating points on a correlation function that represents the timing relationship between a reference signal and the composite signal and for determining an amplitude of the nominal peak of the correlation function and a location in time of the nominal peak;

measurement means for determining the locations in time and amplitudes of at least first and second points on said correlation function, the locations in time being positioned respectively on opposite sides of the location in time of said nominal peak and having respective amplitudes equal to respective fractions of the amplitude of said nominal peak and for determining a first difference between the said first and second points;

displacement means for determining a second difference of said first difference and a selected constant and for identifying said second difference with the displacement in time required to synchronize the timing of said reference signal with said received composite signal.

9. The apparatus of claim 8, wherein said first difference and said second difference are differences in time.

10. The apparatus of claim 8, wherein said first difference and said second difference are differences in amplitude.

11. The apparatus of claim 8, wherein said fractions are within the range of 0.55 to 0.70.

12. The apparatus of claim 8, wherein said fractions are 0.65.

13. Apparatus for synchronizing to a reference signal the timing of a received composite signal, including a preferred, interference-free signal and at least one interfering signal, to determine an undistorted timing of the preferred signal, the apparatus comprising:

correlation means for generating points on a correlation function that represents a timing relationship between said received composite signal and the reference signal, and for determining an amplitude of a nominal peak of the correlation function and a location in time of the nominal peak;

measurement means for determining at least a first point on said correlation function that has an amplitude equal to a fraction of the amplitude of said nominal peak and for determining a first difference between said nominal peak and said first point; and displacement means for determining a second difference between said first difference and a selected constant and for identifying said second difference with the displacement in time required to synchronize the timing of said reference signal with said received composite signal.

14. The apparatus of claim 13, wherein said first difference and said second difference are differences in time.

15. The apparatus of claim 13, wherein said first difference and said second difference are differences in amplitude.

16. The apparatus of claim 13, wherein said fractions are within the range of 0.55 to 0.70.

17. The apparatus of claim 13, wherein said fractions are 0.65.

* * * * *